(12) United States Patent
Stein et al.

(10) Patent No.: US 6,587,864 B2
(45) Date of Patent: Jul. 1, 2003

(54) GALOIS FIELD LINEAR TRANSFORMER

(75) Inventors: Yosef Stein, Sharon, MA (US); Haim Primo, Tikwa (IL); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/051,533

(22) Filed: Jan. 18, 2002

(65) Prior Publication Data

US 2003/0105790 A1 Jun. 5, 2003

Related U.S. Application Data

(60) Provisional application No. 60/334,662, filed on Nov. 30, 2001.

(51) Int. Cl.[7] .................................................. G06F 7/00
(52) U.S. Cl. ........................................................ 708/492
(58) Field of Search ........................................ 708/492

(56) References Cited

U.S. PATENT DOCUMENTS 3,805,037 A * 4/1974 Ellison ........................ 708/492
5,689,452 A * 11/1997 Cameron ..................... 708/492

* cited by examiner

*Primary Examiner*—David H. Malzahn
(74) *Attorney, Agent, or Firm*—Iandiorio & Teska; Kirk Teska; R. Stephen Rosenholm

(57) ABSTRACT

A Galois field linear transformer includes a matrix responsive to a number of input bits in one or more bit streams and having a plurality of outputs providing the Galois field linear transformation of those bits; the matrix includes a plurality of cells, each cell including an exclusive OR logic circuit and AND logic circuit having an output connected to the exclusive OR logic circuit and an input connected to one of the input bits and a programmable storage device for providing an input to its associated AND logic circuit for setting the matrix to obtain a multi-cycle Galois field linear transformation of the inputs in a single cycle.

5 Claims, 4 Drawing Sheets

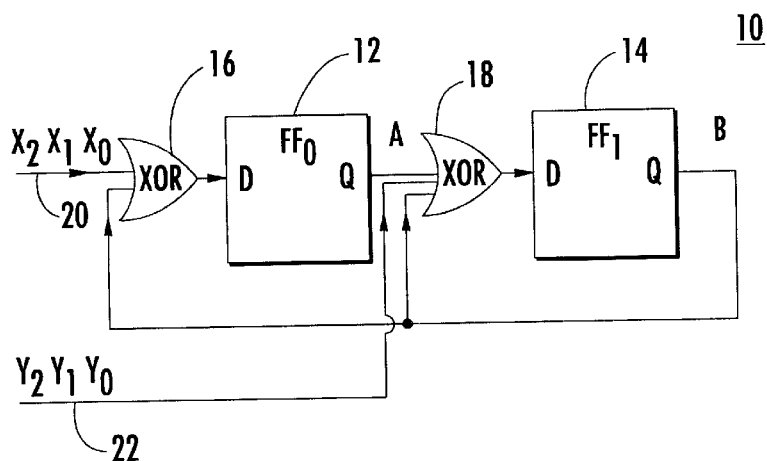
FIG. 1.
(PRIOR ART)
| | INPUTS | | FF STATES | |
| --- | --- | --- | --- | --- |
| | | | 16 | 18 |
| | X | Y | $FF_0$ | $FF_1$ |
| INITIAL STATE | — | — | A | B |
| AFTER $X_0$ & $Y_0$ | $X_0$ | $Y_0$ | $X_0 \oplus B$ | $Y_0 \oplus A \oplus B$ |
| AFTER $X_1$ & $Y_1$ | $X_1$ | $Y_1$ | $X_1 \oplus Y_0 \oplus A \oplus B$ | $X_0 \oplus Y_1 \oplus Y_0 \oplus A$ |
| AFTER $X_2$ & $Y_2$ | $X_2$ | $Y_2$ | $X_2 \oplus X_0 \oplus Y_1 \oplus Y_0 \oplus A$ | $X_1 \oplus B \oplus Y_2 \oplus X_0 \oplus Y_1$ |
FIG. 2.
(PRIOR ART)
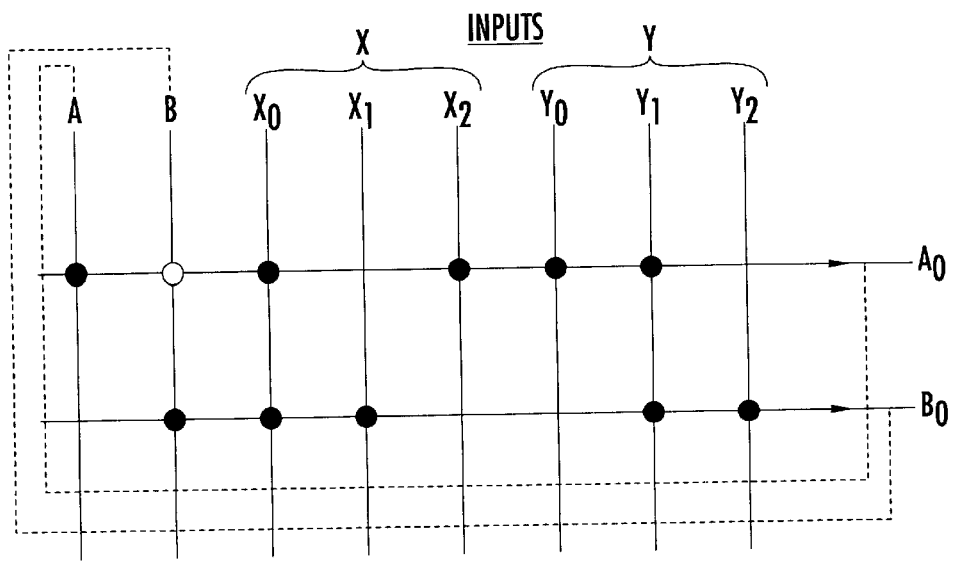
FIG. 3.

US 6,587,864 B2

GALOIS FIELD LINEAR TRANSFORMER

RELATED APPLICATIONS

This invention claims priority of Provisional Patent Application Serial No. 60/334,662 filed Nov. 30, 2001.

FIELD OF THE INVENTION

This invention relates to a Galois field linear transformer and more particularly to such a Galois field linear transformer which achieves multiple cycle transformations in a single cycle.

BACKGROUND OF THE INVENTION

Conventional arithmetic logic circuits used for error correction and detection, communications, encoding and decoding and general bit manipulation using Galois field linear transformations may be implemented in hardware or software. Hardware implementations are expensive, require significant chip space and energy and are not generally programmable. Software implementations avoid some of these disadvantages but have their own shortcomings. For example software implementation can require many instructions per bit for processing. Thus for an implementation requiring four instructions (cycles) per bit a sixteen bit input would consume 64 cycles of machine time. More realistically in a typical software implementation which processes 6 million bits per second using four or five instructions (cycles) per bit 24–30 million instructions or cycles are needed. When as is often the case more than one circuit is used, four or five, then the cycles required increase to 120 to 150 million. And this is doubled for systems using both a transmitter and receiver. This is a substantial portion of the capacity of conventional processors.

BRIEF SUMMARY OF THE INVENTION

It is therefore an object of this invention to provide an improved Galois field linear transformer for e.g., bit manipulation, error correction and detection, communications, encoding and decoding, encryption and decryption, scrambling and descrambling and cyclical redundancy checking using polynomials.

It is a further object of this invention to provide such an improved Galois field linear transformer which accomplishes multiple cycle Galois field linear transformations in a single cycle.

The invention results from the realization that a fast, effective, economical, Galois field linear transformer for accomplishing multi-bit, multi-cycle transformation in a single cycle can be achieved with a matrix including a plurality of cells, each cell including an exclusive OR gate, an AND gate having an output connected to the exclusive OR gate and a programmable storage device for providing an input to its associated AND gate for setting the matrix to obtain a multi-cycle Galois field linear transformation in a single cycle.

This invention features a Galois field linear transformer including a matrix responsive to a number of input bits in one or more bit streams and having a plurality of outputs for providing the Galois field linear transformation of those bits. The matrix includes a plurality of cells each cell including an exclusive OR logic circuit and AND logic circuit having an output connected to the exclusive OR logic circuit and an input connected to one of the input bits and a programmable storage device providing an input to its associated AND logic circuit for setting the matrix to obtain a multi-cycle Galois field linear transformation of the inputs in a single cycle.

In a preferred embodiment each exclusive OR logic circuit may have its output connected to the input of the next successive exclusive OR logic circuit except for the last exclusive OR logic circuit whose output is connected to the output of the matrix and the first exclusive OR logic circuit whose input is connected to a zero level. The programmable storage device may include a number of storage units each one programmed for enabling a different Galois field linear transformation. The inputs to the matrix may include state inputs representative of previous state conditions of the Galois field linear outputs for the matrix the state inputs may be fed back from the previous state conditions represented by the Galois field linear outputs of the matrix.

BRIEF DESCRIPTION OF THE DRAWINGS

Other objects, features and advantages will occur to those skilled in the art from the following description of a preferred embodiment and the accompanying drawings, in which:

FIG. 1 is a schematic diagram of a multi-bit, multi-cycle prior art Galois field linear transformer;

FIG. 2 is an illustration of the signal status of the prior art Galois field linear transformer of FIG. 1;

FIG. 3 is a conceptual diagram of a matrix according to this invention for implementing in a single cycle the multi-cycle transformation depicted in FIGS. 1 and 2;

PREFERRED EMBODIMENT

Figure 7:
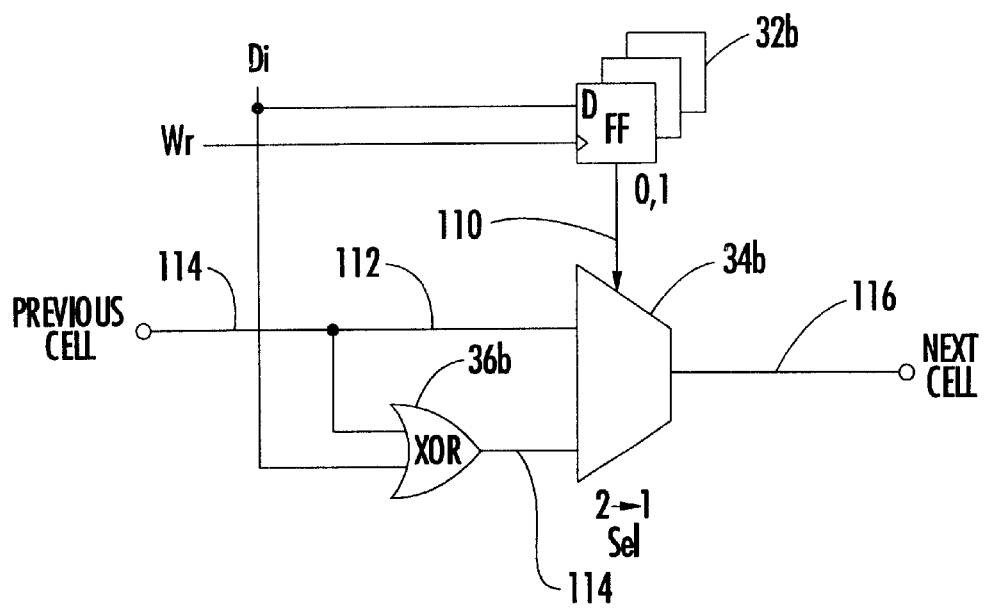
FIG. 7 is an alternative implementation of a cell usable in the matrix of this invention which performs the AND function without a specific AND gate.

There is shown in FIG. 1 a prior art hardwired circuit for performing a Galois field linear transformation circuit 10 including two storage devices flip-flop 12 and flip-flop 14 and two exclusive OR gates 16 and 18. In this particular prior art implementation, two bit streams, the x bit stream input 20 to exclusive OR 16 and the y bit stream 22 provided as an input to exclusive OR 18, are serviced. The output from flip-flop 12, designated A, provides one input to the exclusive OR gate 18. The second input is the y inputs on input 22, and a third input is the output B of flip-flop 14. The output B of flip-flop 14 also provides the second input to exclusive OR gate 16.

In this particular case circuit 10 has as its goal the determination of the condition or output of flip-flops 12 and 14 after a set of three bits have been received on each of the x and y inputs. Thus the inputs of interest are $x_0$, $x_1$, $x_2$ on input 20 and input bits $y_0$, $y_1$, and $y_2$ on the y input line 22. By working through the operation of exclusive OR gates 16 and 18 and flip-flops 12 and 14 with the feedback loop illustrated, it can be shown that the outputs are as shown in the chart of FIG. 2. With the initial state of x and y inputs being absent the output of flip-flops 16 and 18 are shown as A and B. This is the initial state of the flip-flops. It may be zero or it may be any other value or level.

After $x_0$ and $y_0$ have been introduced the inputs are naturally shown as $x_0$ and $y_0$. The output of flip-flop 16 is shown as $x_0 \oplus B$, and the output of flip-flop 18 as $y_0 \oplus A$ ⊕ B. Following the same logic around the circuit after the inputs of bits $x_1$ and $y_1$, the flip-flop 16 has an output of $x_1 \oplus y_0 \oplus A \oplus B$ and flip-flop 18 has an output of $x_0 \oplus y_1 \oplus y_0 \oplus A$. Finally after the third bits have been introduced, $x_2$ and $y_2$, the output of flip-flop 16 is shown as $x_2 \oplus x_0 \oplus y_1 \oplus y_0 \oplus A$ and the output of flip-flop 18 is shown as $x_1 \oplus B \oplus y_2 \oplus x_0 \oplus y_1$.

To get to this point it has taken a number of cycles of operation and a significant amount of hardware. This could also have been implemented in software in which case each of the bits as explained in the background would have required four or more instructions, or cycles of operation, and this is just for the simple case as illustrated with respect to FIGS. 1 and 2. For example if more bit streams z, t, u, v. . . were used and more bits per bit stream were required to reach the goal, for example, five bits per bit stream or 8 or 64 or 128, the size of the hardware in FIG. 1 and the time required by the software as taught by the prior art would be extremely disadvantageous.

This invention results from the realization that this multi-cycle operation for performing the Galois field linear transformation can be avoided by creating a matrix for example, the matrix shown in FIG. 3, which predicts the output goal immediately in just one cycle. If the matrix could be constructed as shown in FIG. 3 then the final output or the condition of the flip-flops 12 and 14 after each of the three bits in the two-bit streams have been processed could be achieved in a single cycle: the matrix could predict in one cycle the output that would normally be generated in a number of cycles.

To accomplish this the matrix simply has a number of inputs including A, B, the x-inputs $x_0$–$x_2$ and the y-inputs $y_0$–$y_2$. To create the final condition $A_0$ for flip-flop 16, one need only connect the inputs A, $x_0$, $x_2$, $y_0$ and $y_1$ in order to obtain the final result as shown in the chart of FIG. 2. Likewise to obtain the final result $B_0$ for the flip-flop 18 as shown in FIG. 2 one need only connect input B $x_0$, $x_1$, $y_1$, and $y_2$.

Figure 4:
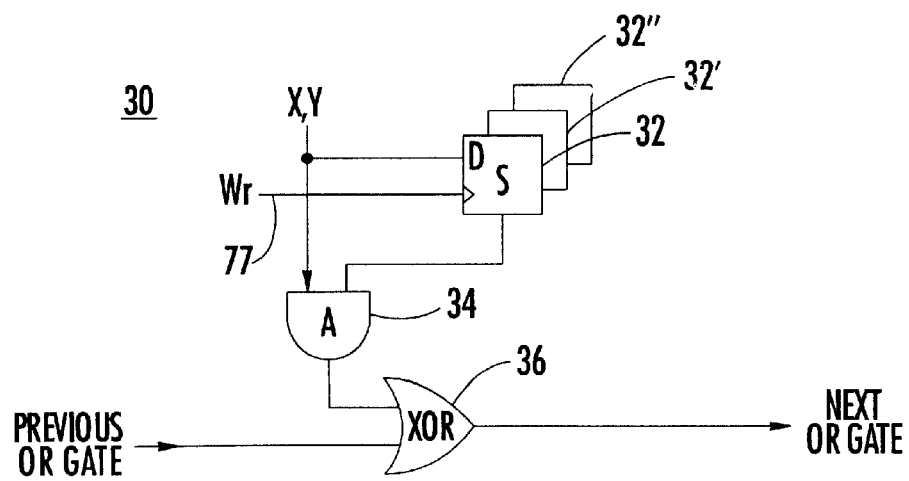
FIG. 4 is a schematic diagram of a single exclusive OR cell utilized in the matrix of this invention.

To create such a matrix it must be constructed of cells wherein each cell 30, FIG. 4, includes a storage device 32 which provides one input to AND gate 34, the other input of which is the bit input, for example, $x_0$, $x_1$, $x_2$, $y_0$, $y_1$, $y_2$, A or B. The proper bit level of the storage device 32 is determined by the bit input level and a write signal or clock pulse on line 77. The output of AND gate 34 is delivered to exclusive OR gate 36. The output of the exclusive OR gate goes to the next exclusive OR gate in line and the other input to the exclusive OR gate 36 comes from the previous exclusive OR gate in line. The output of the last exclusive OR gate in a row actually constitutes an output of the matrix and the input to the first exclusive OR gate is connected to a zero level; there is no previous exclusive OR gate.

Storage device 32 may be a single storage device which stores one bit to be delivered to AND gate 34 to enable it to contribute to the ultimate output desired by the Galois field linear transformation. Alternatively storage device 32 may include a number of storage units as shown in phantom at 32' and 32" or simply include a register which has a number of different bits in it that can be selectively delivered to AND gate 34 depending upon the mode of operation and the desired behavior to be induced in exclusive OR gate 36.

Figure 5:
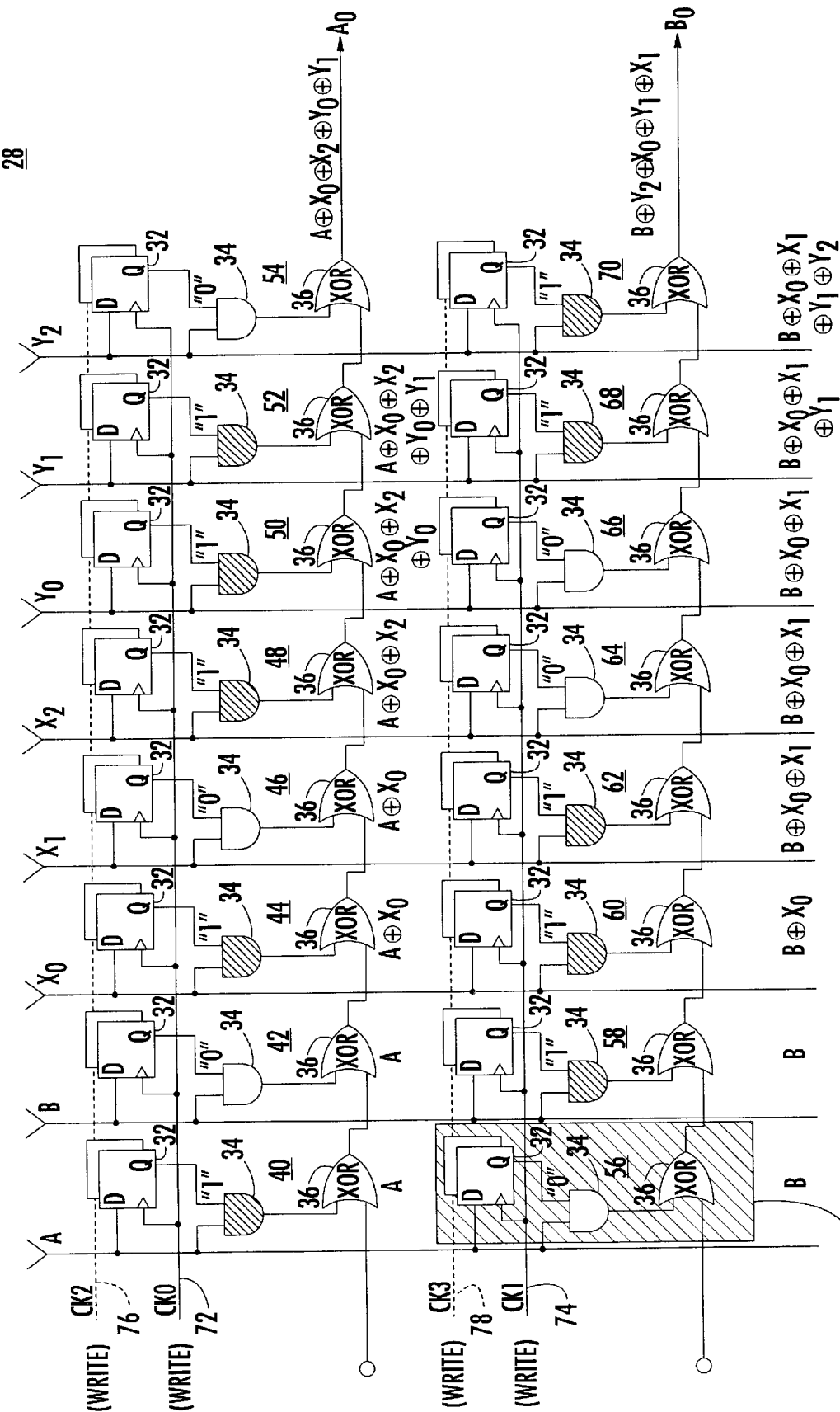
FIG. 5 is a schematic diagram of one implementation of a matrix according to this invention.

A full implementation of a matrix using a plurality of cells 30 is shown in FIG. 5. Before undertaking an explanation of that, however, it should be understood that although the matrix shown in FIG. 3 and implemented in FIG. 5 has specific structure, this is not a necessary limitation of the invention. For example, in the matrices of FIGS. 3 and 5, the initial states of A and B are provided as inputs. But this is not always necessary. For example, if they are zero they need not consume inputs. These inputs could be used for other purposes. In addition in some applications it is desirable to provide as inputs the A and B values and to provide them by a simple feedback from the outputs as shown in phantom in FIG. 3. In addition there need not be two bit streams of three-bits each being serviced. There may be one bit stream with fewer or more bits or there may be a number of bit streams in addition to x and y, each having more or fewer bits in each set to be processed.

The implementation of a matrix FIG. 3 in accordance with this invention is shown in FIG. 5 employing a plurality of exclusive OR cells 30 as shown in FIG. 4.

In this particular implementation, FIG. 5, the matrix includes 16 cells to process 8 inputs A, B, $x_0$, $x_1$, $x_2$, $y_0$, $y_1$, $y_2$ and provide two outputs $A_0$ and $B_0$. Each of the first row of cells 40, 42, 44, 46, 48, 50, 52, and 54 receives the inputs A, B, $x_0$, $x_1$, $x_2$, $y_0$, $y_1$, $y_2$ and provides the output $A_0$ while the second row of cells 56, 58, 60, 62, 64, 66, 68 and 70 responds to the same inputs to provide the second output $B_0$.

Initially a write signal or clock-pulse on line 72 enables each storage device 32 in each of the cells in a first row to provide the proper bit levels one or zero, to its associated AND gate 34 to set the exclusive OR gate 36 so that it predicts in one cycle the ultimate goal of the device. Similarly with respect to the second row of cells 56, 58, 60, 62, 64, 66, 68, 70 a write signal on clock 74 enables storage device 32 in each cell to provide the bit level as shown to its associated exclusive OR gate to enable it to predict immediately the ultimate output of $B_0$ in one cycle. Other clock signals, for example 76 and 78, are available to provide write signals to additional storage devices or stages in the register.

To program the matrix for other modes of operation each of the cells in each row provides its output as an input to the next cell except the last cell whose output constitutes the output of the matrix and the first cell which has no preceding cell and has as its input a zero level as previously explained. The outputs $A_0$ and $B_0$ representative of the present state of the device can be fed back in as A and B or if the system is used in modes where that is not appropriate for example where A and B have zero value these inputs could be ignored or could be utilized for other inputs for example $x_3$ and $y_4$.

It should also be understood that the condition repeats: that is, the same output will be obtained for the next three bits $x_3$, $x_4$, $x_5$ and $y_3$, $y_4$, $y_5$, and the following sets $x_6$, $x_7$, $x_8$ and $y_6$, $y_7$, $y_8$ and so on. The matrix of this invention thus performs the same task iteratively and it does so whether there is one bit stream, two bit streams or many bit streams and whether the set of bits to be processed includes just three as shown here or four or ten or 64 or 128 or 417 or any other number.

While the implementation of each cell in FIGS. 4 and 5 uses a specific exclusive OR gate and an AND gate with a flip-flop, this is not a limitation of the invention. For example, the flip-flop can be implemented with any kind of programmable storage device. And the AND gate and exclusive OR gate need not be implemented in kind so long as these are logic circuits that function in a Boolean sense like an exclusive OR gate and AND gate. For example, in FIG. 7, storage device 32b operates with an exclusive OR gate 36b and a 2:1 multiplexor circuit 34b. If the control signal on line 110 is a zero than the input 112 is passed through from the previous cell, line 114, to the next cell, line 116 and the input on line 114 is inhibited. If the signal online 110 is a one than the signal on line 112 is inhibited and the signal on line 114 is passed through: only one of two signals can be passed at a time by multiplexor circuit 34b. Thus, the Boolean AND function is still performed by an AND logic circuit implemented by the multiplexor 34b.

Figure 6:
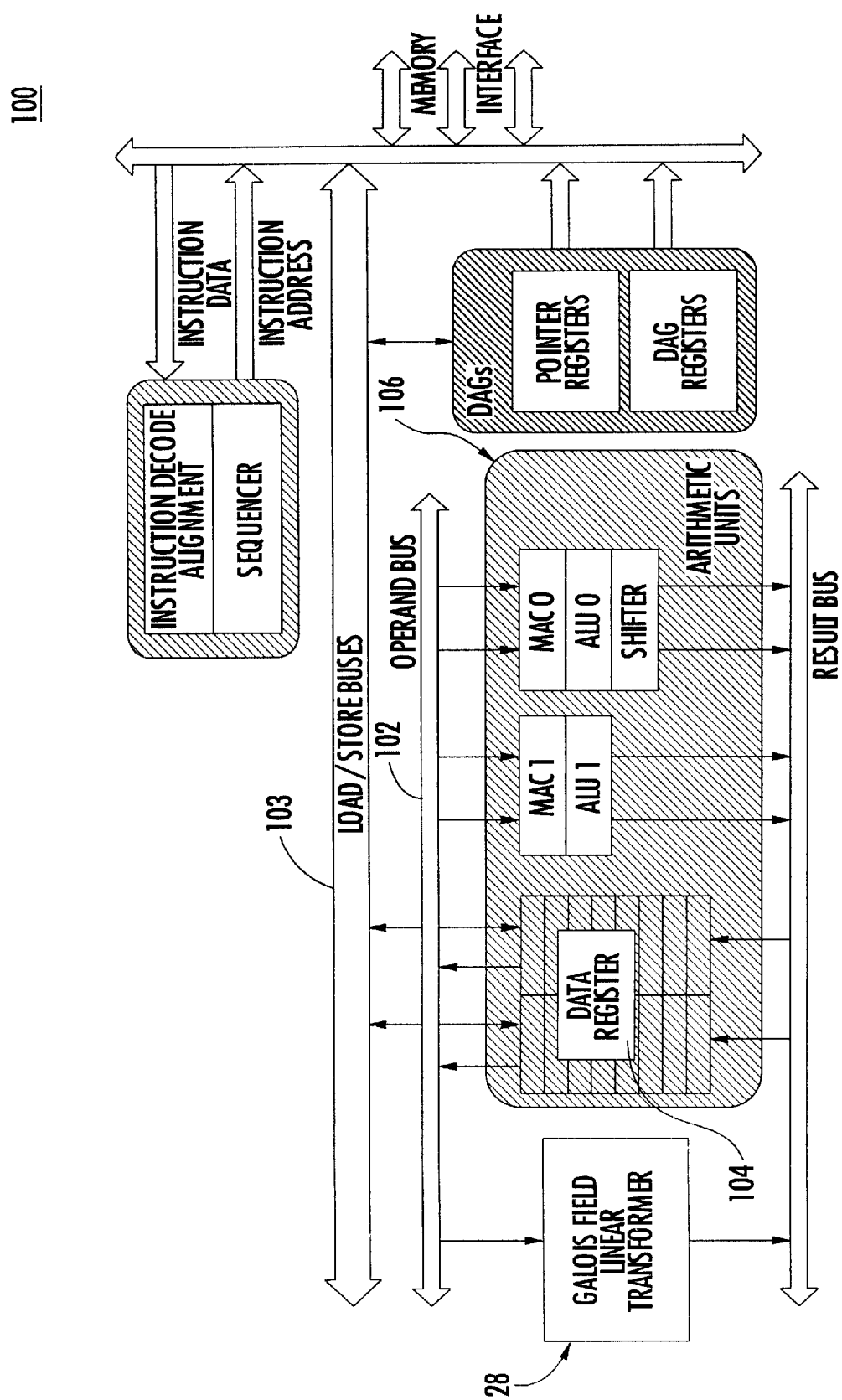
FIG. 6 is a schematic diagram of a Galois field linear transformer according to this invention associated with a digital signal processor.

The Galois field linear transformer 28 is implemented as a function unit within a programmable logic device, such as digital signal processor (DSP) 100, FIG. 6, or general-purpose microprocessor, realized as an integrated circuit. This function unit is operated by a special processor instruction that provides the unit with appropriate operands on buses 102, 103. The data stream to and from the unit is done using the on chip data registers 104 in a form in which Galois field linear transformer 28 functions as a part of the arithmetic unit 106 itself. This combination of the Galois field linear transformer and arithmetic unit allows a more versatile function where the Galois field linear transformation may be performed amongst other traditional operations enabling a wide range of different algorithm implementations. Many different types of architectures and programmable logic devices may benefit from the use of the present invention. More specifically, the unit according to the present invention may alternatively be implemented as a custom logic circuit or as a co-processor or dedicated subsystem.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

1. A Galois field linear transformer comprising: a matrix responsive to a number of input bits in one or more bit streams and having a plurality of outputs for providing the Galois field linear transformation of those bits; said matrix including a plurality of cells, each cell including an exclusive OR logic circuit, an AND logic circuit having an output connected to the exclusive OR logic circuit and an input connected to one of said input bits, and a programmable storage device for providing an input to its associated AND logic circuit for setting the matrix to obtain a multicycle Galois field linear transformation of the inputs in a single cycle.

2. The Galois field linear transformer of claim 1 in which each said exclusive OR gate has its output connected to the input of the next successive exclusive OR logic circuit except for the last exclusive OR logic circuit whose output is connected to the output of the matrix and the first exclusive OR logic circuit whose input is connected to a zero level.

3. The Galois field linear transformer of claim 1 in which said programmable storage device includes a number of storage units each one programmed for enabling a different Galois field linear transformation.

4. The Galois field linear transformer of claim 1 in which said inputs to said matrix include state inputs representative of previous state conditions of the Galois field linear outputs of the matrix.

5. The Galois field linear transformer of claim 4 in which said inputs to said matrix include state inputs fed back from the previous state conditions represented by the Galois field linear outputs of the matrix.

* * * * *